United States Patent
McLellan et al.

(10) Patent No.: US 10,034,286 B2
(45) Date of Patent: Jul. 24, 2018

(54) METHODS AND SYSTEMS FOR BEAM SEARCHING

(71) Applicants: Hubert R. McLellan, Summit, NJ (US); Dmitry Chizhik, Highland Park, NJ (US); Dragan Samardzija, Highlands, NJ (US)

(72) Inventors: Hubert R. McLellan, Summit, NJ (US); Dmitry Chizhik, Highland Park, NJ (US); Dragan Samardzija, Highlands, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/260,911

(22) Filed: Sep. 9, 2016

(65) Prior Publication Data

US 2018/0077702 A1     Mar. 15, 2018

(51) Int. Cl.
| | |
|---|---|
| *H04W 4/00* | (2009.01) |
| *H04W 72/04* | (2009.01) |
| *H04J 11/00* | (2006.01) |
| *H04B 7/0408* | (2017.01) |
| *H04B 7/06* | (2006.01) |

(52) U.S. Cl.
CPC ...... *H04W 72/0446* (2013.01); *H04B 7/0408* (2013.01); *H04B 7/0617* (2013.01); *H04J 11/0086* (2013.01); *H04W 72/046* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2008/0172491 | A1* | 7/2008 | Chhabra | H04L 5/0091 709/227 |
| 2014/0177607 | A1 | 6/2014 | Li et al. | |
| 2014/0293911 | A1* | 10/2014 | Cheong | H04L 27/2656 370/329 |
| 2015/0373618 | A1 | 12/2015 | Deenoo et al. | |
| 2016/0242159 | A1 | 8/2016 | Ho et al. | |
| 2016/0301509 | A1* | 10/2016 | Narasimha | H04L 1/1861 |
| 2016/0323754 | A1* | 11/2016 | Friday | H04W 16/28 |

* cited by examiner

*Primary Examiner* — Shantell L Heiber
(74) *Attorney, Agent, or Firm* — Harness, Dickey & Pierce, P.L.C.

(57) ABSTRACT

In one example embodiment, a method includes transmitting a plurality of first beacons over a first scanning period, the plurality of first beacons associated with different direct energy beams, the transmitting including, transmitting the plurality of first beacons over sub-periods of the first scanning period, respectively; obtaining an indication of a preferred first beacon, the preferred beacon being received by a network element during the transmitting of the plurality of beacons over the first scanning period; and communicating with the element during a scheduled portion of a first data communication period using the beam associated with the preferred first beacon, a length of the first scanning period and a length of the first data communication period forming a length of a time transmission interval.

16 Claims, 12 Drawing Sheets

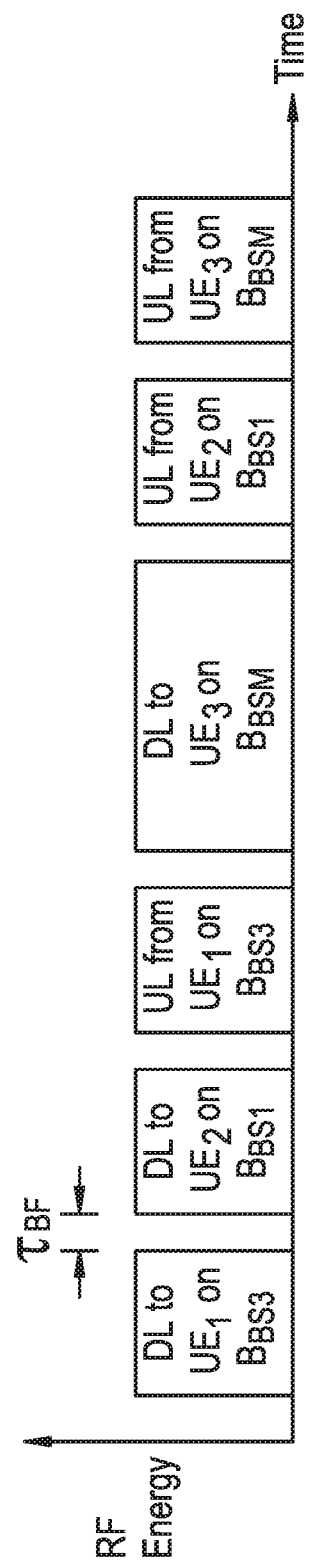

METHODS AND SYSTEMS FOR BEAM SEARCHING

BACKGROUND

Wireless systems are moving to higher frequencies in search of more useable bandwidth. There is 2 GHz of spectrum available for communication use at 60 GHz. This is 100 times the carrier bandwidth offered in LTE systems.

Due to the fall-off of received power with increasing frequency of a single antenna element (Friis's Law), millimeter (mm)-Wave communication links use directional antenna gain at both a transmitter and a receiver to achieve a sufficient operational signal-to-noise ratio (SNR).

Antenna gain is achieved by arrays of antenna elements that operate in symphony to create beams of radio-frequency (RF) energy radiating in a particular direction or beam. These beams are formed by coordinating the relative phases of each individual antenna element so that the RF energy constructively interferes in the desired beam direction and destructively interferes elsewhere. The result is a narrow beam of RF energy in a known direction depending on the antenna elements' geometry and phase relationships. The array of antenna elements forms a phased array antenna.

SUMMARY

Example embodiments are directed to methods and systems for beam searching.

At least one example embodiment provides a method including transmitting a plurality of first beacons over a first scanning period, the plurality of first beacons associated with different direct energy beams, the transmitting including transmitting the plurality of first beacons over sub-periods of the first scanning period, respectively, obtaining an indication of a preferred first beacon, the preferred beacon being received by a network element during the transmitting of the plurality of beacons over the first scanning period and communicating with the element during a scheduled portion of a first data communication period using the beam associated with the preferred first beacon, a length of the first scanning period and a length of the first data communication period forming a length of a time transmission interval.

In an example embodiment, the network element is a user equipment (UE).

In an example embodiment, the method further includes transmitting a scanning window signal to the UE on a first frequency band channel, the scanning window signal indicating a duration for the scanning period for the transmitting the plurality of first beacons of the first scanning period to occur. The obtaining includes, receiving the indication of the preferred beacon on the first frequency band channel, the first frequency band channel associated with a first frequency band, the direct energy beams associated with a second frequency band, and the first frequency band includes frequencies different than frequencies of the second frequency band.

In an example embodiment, the method further includes transmitting a subsequent beacon on the beam associated with the preferred first beacon in a subsequent scanning period, the subsequent beacon including scheduling information identifying a physical random access channel (PRACH) uplink slot and receiving a PRACH message from the UE in response to the subsequent beacon, the communicating during first data communication period being based on the received PRACH message.

In an example embodiment, the method further includes transmitting the preferred beacon and scheduling information for the UE during a subsequent scanning period, the subsequent scanning period being subsequent to the first scanning period, the communicating being based on the scheduling information.

In an example embodiment, the method further includes transmitting a plurality of second beacons over a subsequent scanning period, the subsequent scanning period being subsequent to the first data communication period, the second beacons being the same as the first beacons.

In an example embodiment, the method further includes transmitting a plurality of second beacons over a preceding scanning period before the obtaining the indication, the preceding scanning period preceding the first data communication period, the second beacons being the same as the first beacons.

In an example embodiment, each of the first beacons includes an identification of the associated beam.

In an example embodiment, at least one of the first beacons includes scheduling information identifying a physical random access channel (PRACH) uplink slot.

In an example embodiment, the obtaining includes receiving a PRACH message in response to the UE receiving the scheduling information identifying the PRACH uplink slot, the indication being the received PRACH message.

At least one example embodiment provides a network element including a transceiver configured to transmit a plurality of first beacons over a first scanning period, the plurality of first beacons associated with different direct energy beams, the transceiver further configured to transmit the plurality of first beacons over sub-periods of the first scanning period, respectively, a processor configured to obtain an indication of a preferred first beacon, the preferred beacon being received by another network element during the transmitting of the plurality of beacons over the first scanning period and communicate with the element during a scheduled portion of a first data communication period using the beam associated with the preferred first beacon, a length of the first scanning period and a length of the first data communication period forming a length of a time transmission interval.

In an example embodiment, the network element is a base station and the another network element is a user equipment (UE).

In an example embodiment, the transceiver is configured to transmit a scanning window signal to the UE on a first frequency band channel, the scanning window signal indicating a duration for the scanning period for the transmitting the plurality of first beacons of the first scanning period to occur and the processor is configured to obtain the indication of the preferred beacon on the first frequency band channel, the first frequency band channel associated with a first frequency band, the direct energy beams associated with a second frequency band, and the first frequency band includes frequencies different than frequencies of the second frequency band.

In an example embodiment, the transceiver is configured to transmit a subsequent beacon on the beam associated with the preferred first beacon in a subsequent scanning period, the subsequent beacon including scheduling information identifying a physical random access channel (PRACH) uplink slot and receive a PRACH message from the UE in response to the subsequent beacon, the communicating during first data communication period being based on the received PRACH message.

In an example embodiment, the transceiver is configured to transmit the preferred beacon and scheduling information for the UE during a subsequent scanning period, the subsequent scanning period being subsequent to the first scanning period, the communicating being based on the scheduling information.

In an example embodiment, the transceiver is configured to transmit a plurality of second beacons over a subsequent scanning period, the subsequent scanning period being subsequent to the first data communication period, the second beacons being the same as the first beacons.

In an example embodiment, the transceiver is configured to transmit a plurality of second beacons over a preceding scanning period before the obtaining the indication, the preceding scanning period preceding the first data communication period, the second beacons being the same as the first beacons.

In an example embodiment, each of the first beacons includes an identification of the associated beam.

In an example embodiment, at least one of the first beacons includes scheduling information identifying a physical random access channel (PRACH) uplink slot.

In an example embodiment, the processor is configured to obtain a PRACH message in response to the UE receiving the scheduling information identifying the PRACH uplink slot, the indication being the received PRACH message.

BRIEF DESCRIPTION OF THE DRAWINGS

Example embodiments will be more clearly understood from the following detailed description taken in conjunction with the accompanying drawings. FIGS. 1-9 represent non-limiting, example embodiments as described herein.

FIG. 1 illustrates a communication system, according to an example embodiment;

FIG. 3C illustrates an example embodiment of a data communication period;

FIG. 5 illustrates a major cycle of a beam sweep according to an example embodiment;

FIG. 6 illustrates a method of beam searching according to an example embodiment;

FIG. 7 illustrates a method of beam searching according to an example embodiment;

FIG. 8 illustrates a base station according to an example embodiment; and

FIG. 9 illustrates a UE according to an example embodiment.

DETAILED DESCRIPTION

Figure 1:
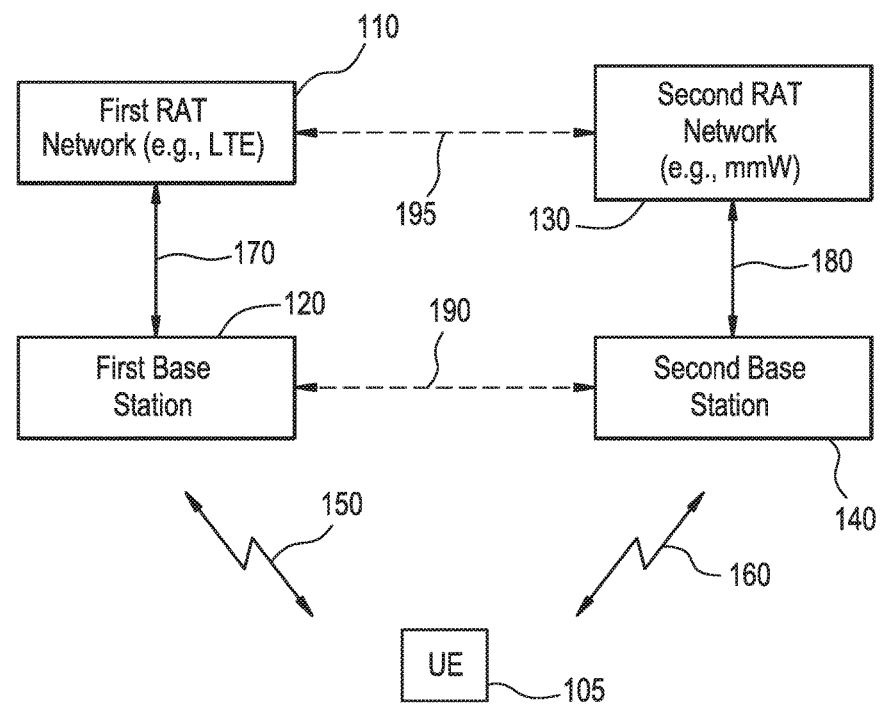

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be magnetic (e.g., a floppy disk or a hard drive) or optical (e.g., a compact disk read only memory, or 'CD ROM'), and may be read only or random access. Example embodiments are not limited by these aspects of any given implementation.

FIG. 1 illustrates a communication system, according to an example embodiment.

FIG. 1 illustrates a communication system 100 where an access terminal (e.g., a UE) 105 communicates with a first base station 120 that includes circuitry for a first radio access network (RAT) 110 (e.g., the base station 120 uses LTE technology or some other RAT to communicate) and a second base station 140 that includes circuitry for a second RAT 130 (e.g., the base station 140 uses mmWave technology or some other direct energy beam network to communicate). A direct energy beam is a direct electromagnetic energy beam that is focused (i.e., a focused beam and is not broadcast) may encompass a broad range of frequencies such as mmWave, centimeter wave, microwave and infrared. The UE 105 includes circuitry to communicate with the first base station 120 over a communication link 150 and circuitry to communicate with the second base station 140 over a communication link 160. For the sake of simplicity, it should be understood that the communication links 150 and 160 are used to illustrate signaling and data communications for their respective RAT technologies.

The first base station 120 communicates with other components of a first RAT network 110 via a link 170 and the second base station 140 communicates with other components of the second RAT network 130 via a communication link 180. The first base station 120 and the second base station 140 may communicate with each other over a link 190 (e.g., X2 interface) or through a link 195 (e.g., S2 interface).

Because the UE 105 can access both the first RAT network 110 and the second RAT network 130, the capability of one network may be used to supplement the operation of the other network to improve performance. In an example implementation, an LTE network and a mmWave network may be connected by an X2 interface.

Figure 2A:
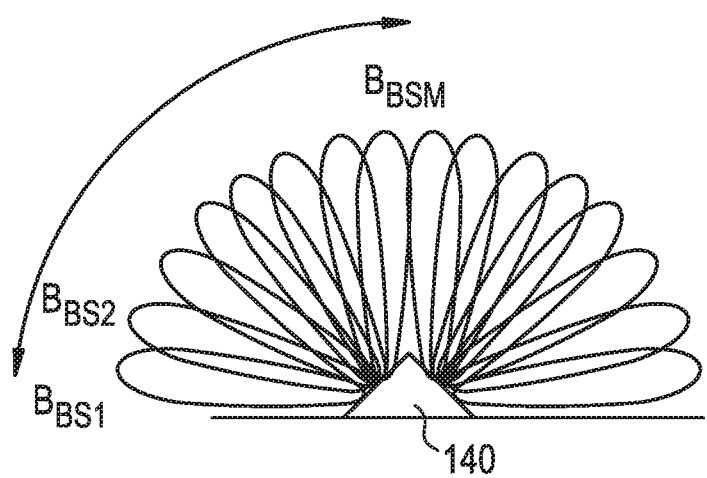
FIG. 2A illustrates an example embodiment of a plurality of beams generated by a base station.

FIG. 2A illustrates an example embodiment of a plurality of beams generated by the second base station 140. The second base station 140 uses a phased array antenna for each beam sweep. In the example shown in FIG. 2A, the second base station 140 includes two phased array antennas to generate two 90 degree beam sweeps. It should be understood that example embodiments are not limited to the example shown in FIG. 2A. For example, the second base station may generate three 60 degree beam sweeps across 180 degrees. In other example embodiments, the second base station 140 may generate beam sweeps across 360 degrees. While a phased array antenna is described with reference to FIGS. 2A-2B, it should be understood that any antenna that generates a directed radio-frequency (RF) signal may be used.

In the example shown in FIG. 2A, the second base station 140 is configured to generate direct energy beams (e.g., mmWave beams) $B_{BS1}$-$B_{BSM}$ across a 90 degree beam sweep.

Figure 2B:
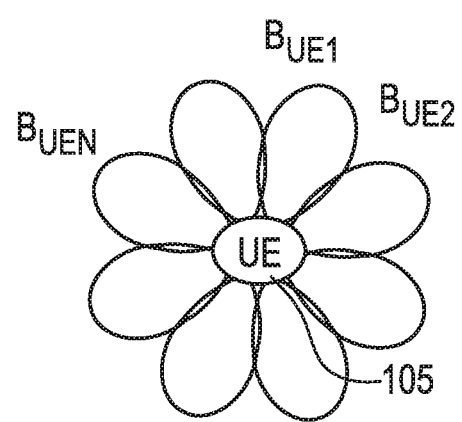
FIG. 2B illustrates an example embodiment of a plurality of beams generated by a user equipment (UE)

FIG. 2B illustrates an example embodiment of a plurality of beams generated by the UE 105. The UE 105 uses a phased array antenna for a beam sweep. In the example shown in FIG. 2B, the UE 105 generates a beam sweep having beams $B_{UE1}$-$B_{UEN}$.

When RF communication systems operate in a power limited realm, the systems use antenna gain at both transmitter and receiver to achieve a desired signal to noise ratio. Antenna gain is achieved by directing the RF energy in a specific direction, forming a beam. Of all possible transmitter beam directions and receiver beam directions, one particular combination will provide a better communication channel and signal to noise ratio than the other combinations.

Example embodiments are directed to methods and systems for finding a set of a transmitter beam (e.g., one of $B_{BS1}$-$B_{BSM}$) and a receiver beam (e.g., one of $B_{UE1}$-$B_{UEM}$). In the example embodiments described below, a base station may perform time division multiplexing (TDM) of millimeter wave (mmWave) resources.

Figure 3A:
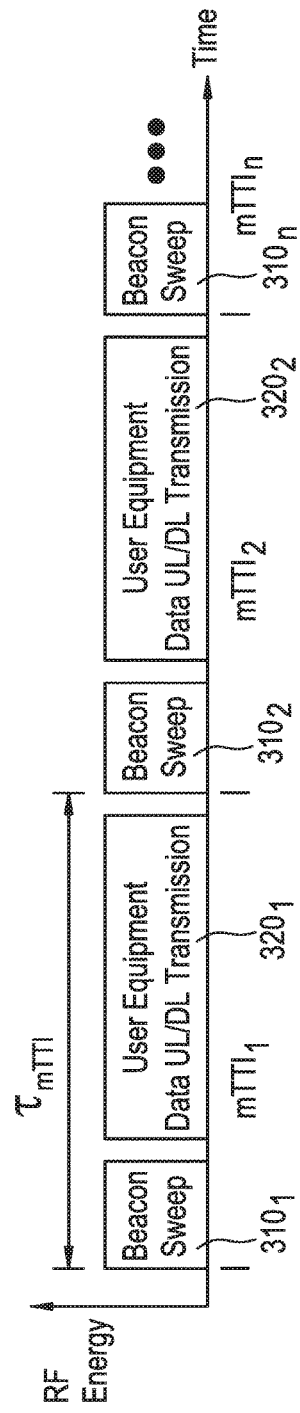
FIG. 3A illustrates a mmWave Transmission Time Interval (mTTI) used by a base station according to an example embodiment.

FIG. 3A illustrates a mmWave Transmission Time Interval (mTTI) used by the second base station 140 to search for a transmitter beam to use for communicating with the UE 105. As shown in FIG. 3A, each mTTI has a time period of $\tau_{mTTI}$ and includes a beacon sweep period (scanning period) 310 and a data communication period 320. For example, intervals $mTT_1$-$mTTI_n$ include a scanning period $310_1$-$310_n$ and a data communication period $320_1$-$320_n$, respectively. Each of the scanning periods $310_1$-$310_n$ may be the same.

As described below, a beam search function and control information of the base station 140 is performed on a beam by beam basis. Combining these two system functions reduces overhead and allows bandwidth to carry user traffic.

Figure 3B:
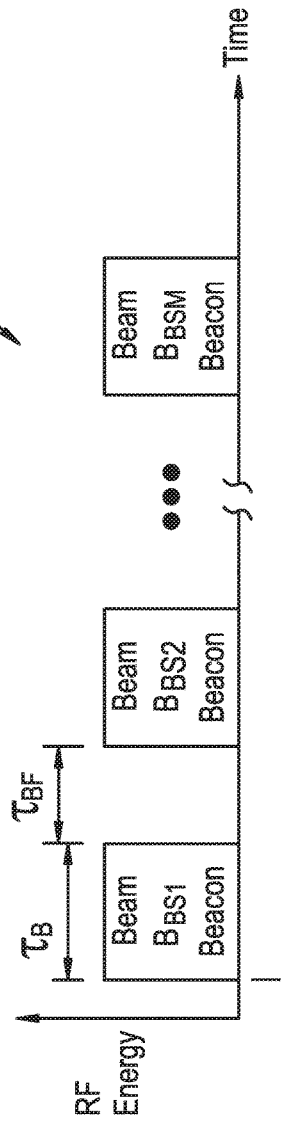
FIG. 3B illustrates an example embodiment of a scanning period according to an example embodiment.

FIG. 3B illustrates an example embodiment of the scanning period 310. During the scanning period 310, the base station 140 transmits the beacons using the direct energy beams $B_{BS1}$-$B_{BSM}$, respectively. In other words, the base station 140 performs periodic sweeps over its number of addressable beams, $B_{BS1}$-$B_{BSM}$, by transmitting a defined beacon in each beam direction. In an example embodiment, a beacon is a regularly occurring signal at a repeating time signal that identifies an available mmWave communication resource. In other embodiments, that beacon may occur at a non-periodic time intervals.

As shown in FIG. 3B, each beacon is of $\tau_B$ duration and separated by $\tau_{BF}$ transmission gaps as the RF energy is switched to a different direction to form a new beam. As an example, the transmission gap $\tau_{BF}$ is zero (e.g., when each antenna element is driven by a separate digital stream). In another example, the transmission gap $\tau_{BF}$ is the amount of time to switch to transmit another beam.

Each beacon may be one symbol and include at least two components, (1) a waveform that assists detection and user equipment synchronization (acquisition waveform) and (2) information bits. The beacon is in a decodable format known by the UE 105. The information on each beacon identifies the base station 140, base station characteristics (e.g., beacon sweep period, GPS coordinates, hours of operation, etc.), the particular beam (e.g., one of the direct energy beams $B_{BS1}$-$B_{BSM}$) the beacon is transmitted on and scheduling information for subsequent transmissions. For example, the beacons may include direct sequence spread spectrum (DSSS) codes that convey the identification of the beam. In other example embodiments, the scheduling information and identification may be transmitted in separate beacons.

After M beacons in the scanning period 310, the base station 140 uses the rest of the interval $mTTI_1$ to send and receive data to various UEs using directional beams particular to those UEs. Referring back to FIG. 3A, the data communication occurs in the data communication periods $320_1$-$320_n$.

In order for a transmitter and receiver beam pair to be formed, a network element performs a beam sweep over all beams while another network element listens on one of its receiving beams. Then in a next beam sweep over all beams of the network element, the another network element listens on another of its receiving beams. Thus, the transmitter of beams operates in a minor cycle, while the receiver operates in a major cycle.

Since both the base station 140 and the UE 105 use beam forming, then the cross product of all beams $B_{BS1}$-$B_{BSM}$ and $B_{UE1}$-$B_{UEN}$ is searched. In one example embodiment, the base station 140 sequences through its possible transmit beams $B_{BS1}$-$B_{BSM}$ and the UE 105 listens. Also the number of potential beams may be fixed for the base station 140, but may vary depending on capabilities of the UE 105. In an example embodiment, the base station 140 supports more addressable beams than the UE 105 and listening windows may be specified by a different frequency system (e.g., from the base station 120). The UE 105 listens on one of its beams $B_{UE1}$-$B_{UEN}$ while the base station 140 cycles through all of its possible transmit beams $B_{BS1}$-$B_{BSM}$.

In this example, a minor cycle is the base station 140 looping over all of its addressable beams $B_{BS1}$-$B_{BSM}$, while a major cycle is the UE 105 looping over its addressable beams $B_{UE1}$-$B_{UEN}$. Combining beacon function with dissemination of scheduling information reduces the overall system overhead required to support user communication.

In FIG. 3B, sweeping through the base station's beams in every mTTI forms the minor cycle of the beam search algorithm.

FIG. 3C illustrates an example embodiment of a data communication period. Following the scanning period 310 in the mTTI, the base station 140 schedules data communications in the data communication period 320 of the mTTI.

In the example shown in FIG. 3C, the base station schedules uplink and downlink transmissions to/from user equipments $UE_1$-$UE_3$ using the beams corresponding to the preferred beacons, respectively. In the example of FIG. 3, the beams of the preferred beacons for UE1-UE3 are $B_{BS3}$, $B_{BS1}$ and $B_{BSM}$, respectively. Each scheduled data communication slot in the data communication period 320 is separated by the time gap $\tau_{BF}$.

Figure 3D:
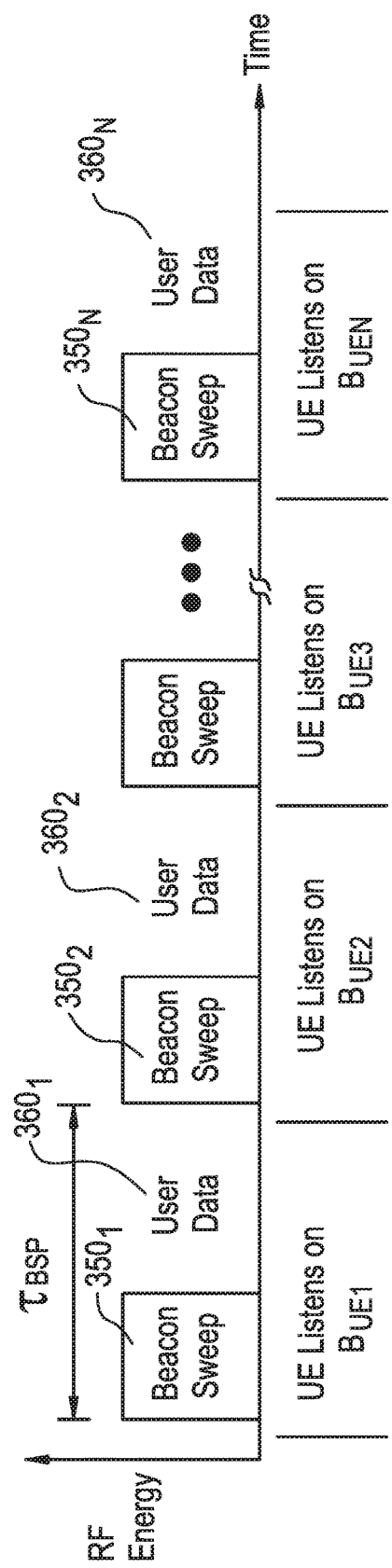
FIG. 3D illustrates an example embodiment of a major cycle of a beam search.

FIG. 3D illustrates a major cycle of the beam search according to an example embodiment. The major cycle may be performed by the UE 105 when the base station 140 performs the minor cycle.

The major cycle is performed by the UE 105 as it cycles through the beams $B_{UE1}$-$B_{UEN}$ listening for potential beacons once each UE sweep period, as shown in FIG. 3D. For example, during a first beacon sweep period, the UE listens for beacons on beams $B_{BS1}$-$B_{BSM}$ from the base station 140 using the beam $B_{UE1}$. After listening for N UE beacon sweep periods, the UE 105 identifies the preferred beacon of the corresponding beam from the base station 105 and the receiver beam (one of $B_{UE1}$-$B_{UEN}$) combination that generates a best (and/or desired) signal to noise ratio (SNR).

Each UE sweep period is a length of $\tau_{BSP}$. The length of time $\tau_{BSP}$ may be a total of the beacon sweep period from the base station (e.g., length of time of $350_i$) and the data portion (e.g., $350_i$). Thus, in one example embodiment, $\tau_{BSP}$ is the same length of time as mTTI.

The base station 140 and the UE 105 may only know about the number of beams in their respective antenna configurations. If the UE beacon sweep period $\tau_{BSP}$ is longer than the amount of time required to sweep through all the base station beams $B_{BS1}$-$B_{BSM}$, then the UE 105 does not need to know the number of beams for the base station 105.

The base station 120 may assist the base station 140 in establishing communications with the UE 105. For example, existing different frequency communication channels could be used as an assist to inform the UE 105 of the approximate duration of the base station's beam sweep periods. While example embodiments discussed herein focus on initialization, it should be understood that the base station 120 may also be used to assist in configuration, data control and acknowledgements. As a result, the link 160 between the base station 140 and the UE 105 would be used for just data.

The first base station 120 may transmit a scanning window signal to the UE 105 on an existing band (e.g., LTE using the communication link 150, out of band assist) that is different than mmWave. The first base station 120 and the second base station 140 may be a co-located base station or separate base stations.

The transmission scanning window signal indicates the duration of the base station beacon sweep period 310. Since there is some uncertainty due to potentially different propagation paths of the communication paths 150 and 160, the UE 105 is directed to begin the UE beacon sweep period slightly before the base station's beacon sweep period and to listen for a window length of time such that each beam of the UE 105 scans during at least a part of the scanning period 310 of the base station 140.

Once the UE 105 identifies a preferred beacon from the base station 140, the UE 105 may use an out of band method such as the existing lower frequency LTE connection with the base station 120 or low-latency 5G to indicate the preferred beam. The base station 120 then informs the base station 140 of the preferred beacon of the corresponding beam to use prior to synchronization.

Once the base station 140 receives the indication of the preferred beam, the base station 140 then performs ranging to take into account propagation delays between sending and receiving using a physical random access channel (PRACH). The base station 140 transmits a subsequent beacon with scheduling information for a PRACH message on the preferred beam. The subsequent beacon on the preferred beam identifies a scheduled uplink slot for the UE 105 to respond to the PRACH message in a fixed part of the data communication period (e.g., 320$_2$). The UE 105 uses the scheduled uplink slot to transmit a PRACH message to the base station 140. When the base station 140 receives the PRACH message from the UE 105, the base station 140 transmits another beacon on the preferred beam with a range time adjustment for the UE 105. The UE 105 uses the range time adjustment to adjust its transmissions. The base station 140 and the UE 105 are then synchronized.

In another example embodiment, the base station 120 may use the different communication channel (e.g., LTE) to inform the UE 105 of the timing information of the PRACH.

In an out of band assist example embodiment, the base station 140 can be powered down until the base station 120 determines mmWave capability in the UE 105 and a request from the UE 105 for higher bandwidth. The base station 140 may then wake up the base station 120 when the base station 140 detects mmWave capability in the UE 105 and the request from the UE 105 for higher bandwidth.

It should also be understood that a back channel such as LTE is not required to establish communications between the UE 105 and the base station 140. The base station 140 and the UE 105 may operate in a standalone system.

In the standalone system (i.e., without out of band assist), the base station 140 may explicitly schedule the PRACH message in every beacon or every desired number of beacons such as periodically. The scheduling information for the PRACH message identifies a uplink slot for the UE 105 to respond. In the standalone system, the preferred beam is implied by the base station 140 to be the received beam used to receive the PRACH message from the UE 105. Once the base station 140 receives the response from the UE 105, the synchronization process is the same as described above with respect to the out of band assist.

As mentioned above, each beacon may include scheduling information. For example, the scheduling information is used for PRACH and once synchronized is used for data communications.

The scheduling information includes a UE id and identifies an UL/DL direction, modulation/coding scheme and type (e.g., data or PRACH), starting symbol (relative to beacon) and a number of symbols duration (e.g., at least one of assigned uplink and downlink slots in the following data communication period 320). For example, the base station 140 may transmit scheduling information to the UE 105 in the scanning period 310$_2$ using the beam corresponding to the preferred beacon and may receive/transmit data during a subsequent data communication period (e.g., 320$_2$-320$_M$) in accordance with the scheduling information for the UE 105. A beacon defines an entire schedule for a subsequent data communication period 320 by identifying the UEs assigned to the uplink and downlink slots in the subsequent data communication period 320.

The UE 105 can monitor the various beacons while communicating with the base station on its currently preferred beam. If a better beam combination is discovered, the UE 105 informs the base station 140 to switch to a better beam. This process is performed as a negotiation with the base station 140 to avoid wasting resources such that the UE 105 does not listen on another beam while the base station 140 is transmitting to the UE 105 on the preferred beam. For example, the base station 140 and the UE 105 agree ahead of time which mTTI are to be used to schedule data transfers and which mTTI are dedicated to measuring alternative beam combinations. Beam search could be an ongoing activity during time-outs from data transfer, or it could be performed when the current beam fails.

In an example embodiment, the beam searching procedure permits a UE to only have to decode the control symbol(s) of their beacon at known times of a recurring mTTI period. Then, the UE can skip all symbol times not intended for it and only decode (or encode and transmit) its symbols at a specified time.

Figure 4A:
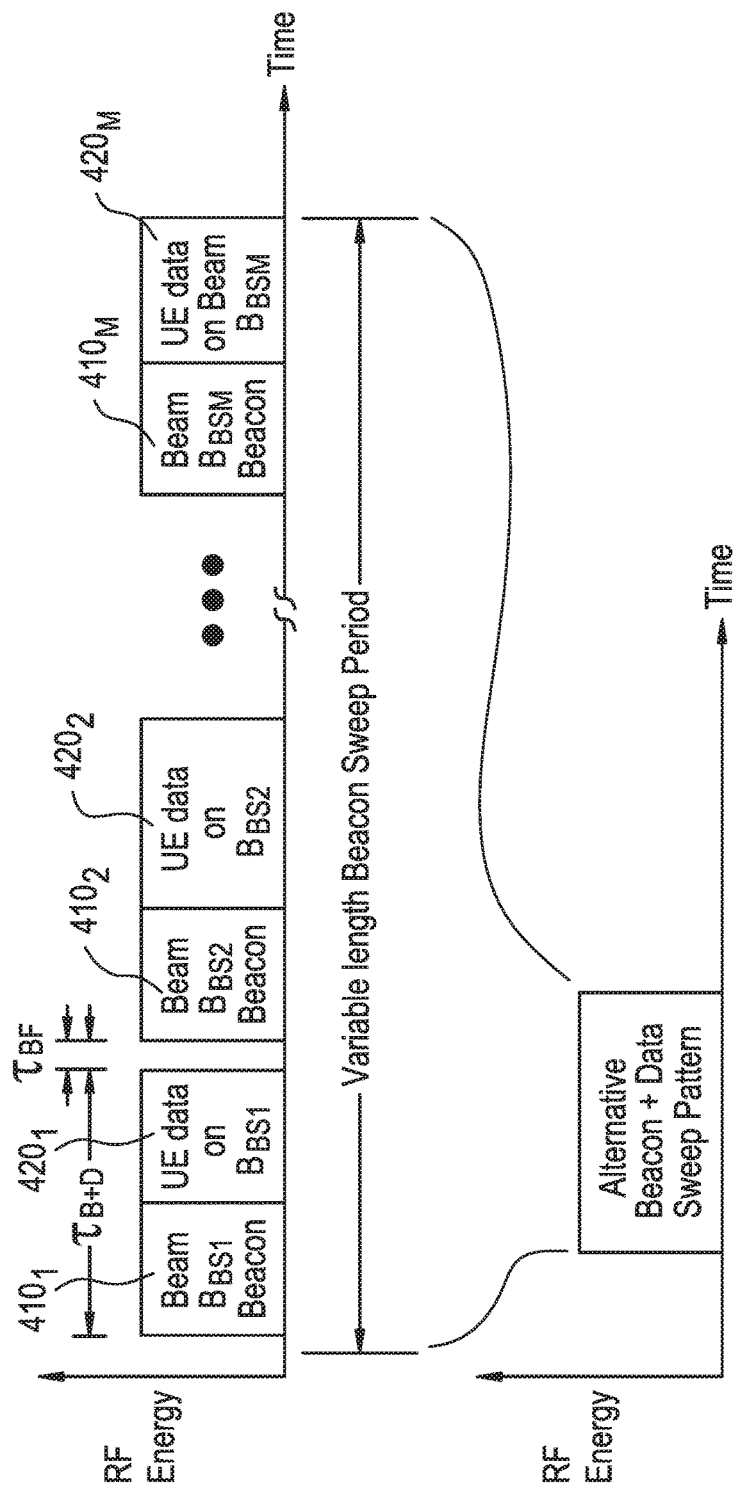
FIGS. 4A-4B illustrate an alternative example embodiment of a beam sweep.
Figure 4B:
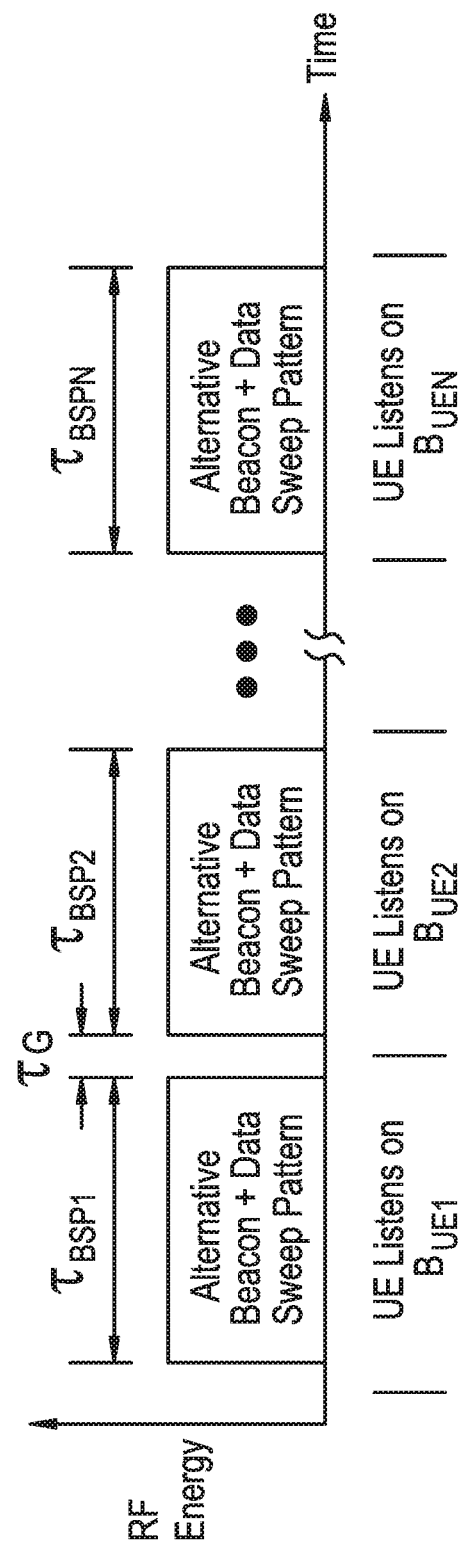

FIGS. 4A-4B illustrate an alternative example embodiment of a beam sweep. FIG. 4A illustrates a minor cycle of the beam sweep and FIG. 4B illustrates a major cycle of the beam sweep. The beam sweep of FIG. 4A may be performed by the base station 140, for example. In the beam sweep of FIG. 4A, the base station 140 transmits a beacon on a particular beam direction followed immediately by any data transmission to user equipment on that same beam. For example, the base station transmits a beacon on the beam $B_{BS1}$ during a scanning sub-period 410$_1$ and then transmits data on the beam $B_{BS1}$ during a data communication sub-period 420$_1$. After transmitting the data on the beam $B_{BS1}$, the base station 140 transmits a beacon on the beam $B_{BS2}$ during the scanning sub-period 410$_2$. A beam forming delay $\tau_{BF}$ (which could be zero) is implemented between each data communication sub-period 420$_i$ and scanning sub-period 410$_{i+1}$.

A beacon sweep period (410$_1$-420$_M$) is variable as the transmission time allocated on each beam direction is dependent on a user's bandwidth needs.

Referring to FIG. 4B, the UE 105 listens on beams BUE1-BUEN during the UE scanning and data periods of time $\tau_{BSP1}$-$\tau_{BSPN}$, respectively.

Figure 5:
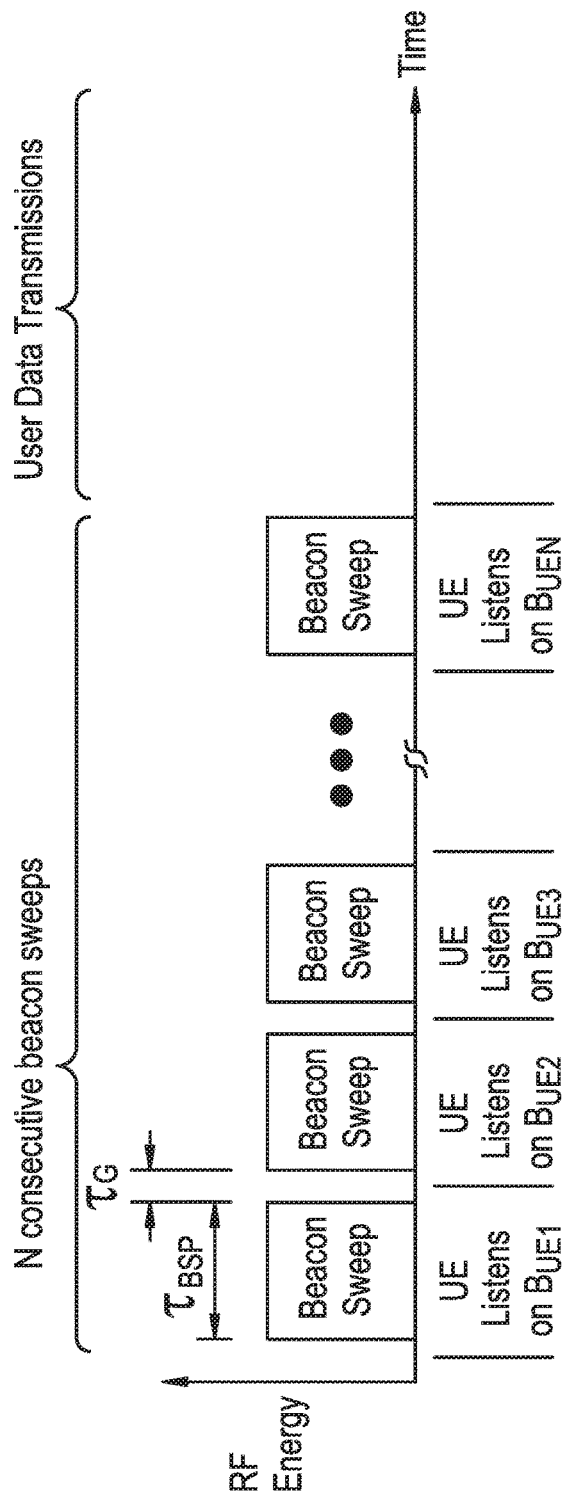

FIG. 5 illustrates a major cycle of a beam sweep according to an example embodiment. The major cycle of FIG. 5 may be performed by the UE 105. Using the same beacon sweep defined by FIG. 3A, the major cycle of FIG. 5 groups all UE beam $B_{UE1}$-$B_{UEN}$ sweeps together and places user data transmissions after the entire search of transmitter and receiver beam directions is performed. As the UE 105 does not have complete timing knowledge prior to synchronizing with the base station 140, there is uncertainty at the UE 105 about when the base station's beacon sweep begins. Thus, the UE 105 can switch to new listening beam directions without missing any beacons, as long as the UE 105 listens on the same received UE beam for as long as or greater than $\tau_{BSP}$.

Figure 6:
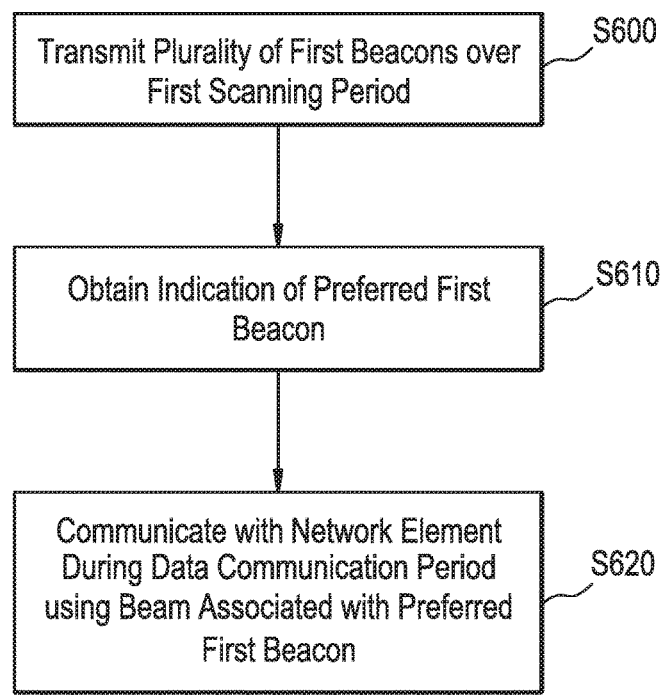

FIG. 6 illustrates a method of beam searching according to an example embodiment. The method of FIG. 6 may be performed by a network element such as the second base station 140. However, it should be understood that example embodiments are not limited thereto and the UE 105 may perform the method of FIG. 6.

At S600, the base station 140 transmits a plurality of first beacons over a first scanning period. The plurality of beacons is associated with the different direct energy beams $B_{BS1}$-$B_{BSM}$. In other words, the base station 140 performs a beam sweep, by transmitting beacons across the beams $B_{BS1}$-$B_{BSM}$, respectively.

At S610, the base station 140 receives an indication of a preferred beacon. As described above, the base station may explicitly receive the indication from the base station 120 or it may be implied in the standalone system.

At S620, the base station 140 communicates with the UE 105 during a data communication period using the beam associated with the preferred beacon. As discussed above, each beacon includes scheduling information for a subsequent data communication period. The UE 105 communicates during the subsequent data communication period in accordance with the received scheduling information.

Figure 7:
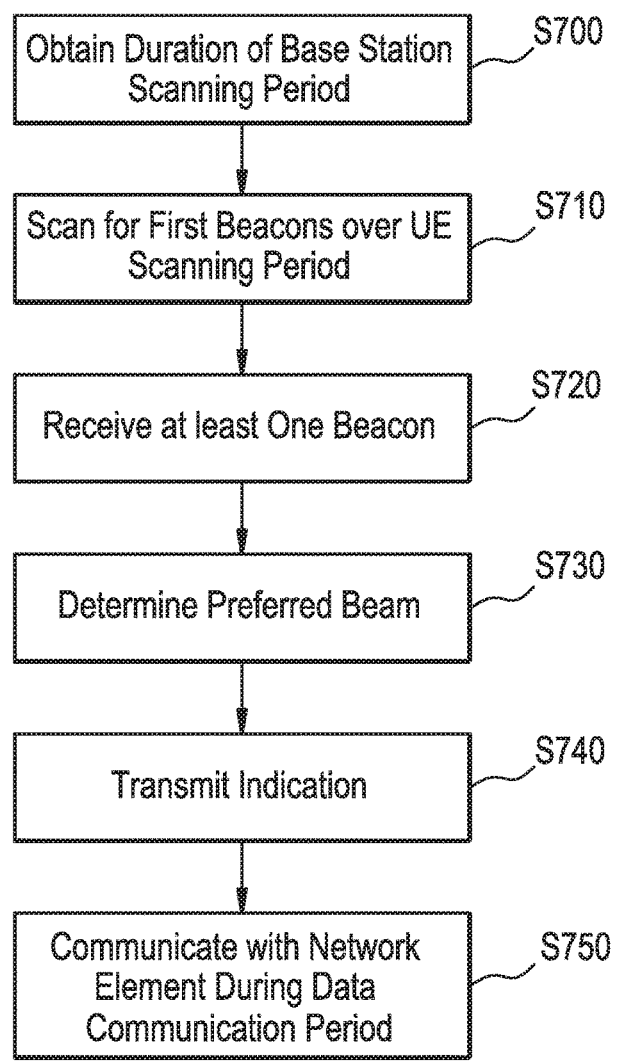

FIG. 7 illustrates a method of beam searching according to an example embodiment. The method of FIG. 7 may be performed by a network element such as the UE 105. However, it should be understood that example embodiments are not limited thereto and the base station 140 may perform the method of FIG. 7.

At S700, the UE 105 receives a window signal which indicates a duration of a base station scanning period. At S710, the UE 105 scans for the beacons over a scanning period for the UE 105. As described above, the UE 105 scans for the beams $B_{BS1}$-$B_{BSM}$ over the UE's beams $B_{UE1}$-$B_{UEN}$. Upon receiving at least one beacon at S720, the UE 105 determines a preferred beam correspond to the received beacon at S730. The UE 105 transmits an indication of the preferred beam to the base station 120 or is implied by the base station 140 based on the PRACH message transmitted by the UE 105. Once synchronized, the UE 105 and the base station 140 exchange full messages during the data communication periods at S750.

Figure 8:
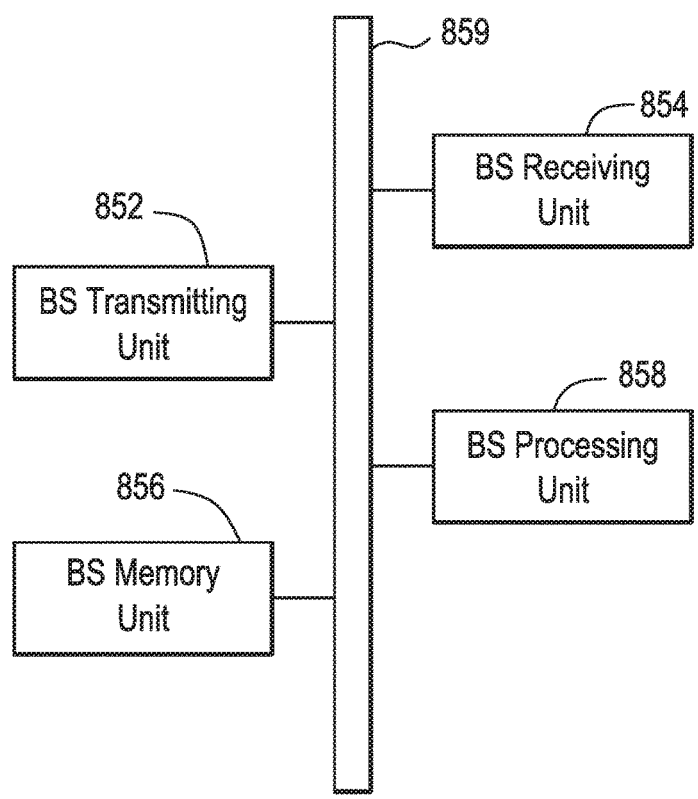

FIG. 8 illustrates the base station 140 according to an example embodiment. It should be also understood that the base station 140 may include features not shown in FIG. 8 and should not be limited to those features that are shown.

Referring to FIG. 8, the base station 140 may include, for example, a data bus 859, a transmitting unit 852, a receiving unit 854, a memory unit 856, and a processing unit 858. While illustrated separately, the transmitting unit 852 and the receiving unit 854 may be a single transceiver.

The transmitting unit 852, receiving unit 854, memory unit 856, and processing unit 858 may send data to and/or receive data from one another using the data bus 859. The transmitting unit 852 is a device that includes hardware and any necessary software for transmitting wireless signals including, for example, data signals, control signals, and signal strength/quality information via one or more wireless connections to other network elements in the wireless communications network 100.

The receiving unit 854 is a device that includes hardware and any necessary software for receiving wireless signals including, for example, data signals, control signals, and signal strength/quality information via one or more wireless connections to other network elements in the network 100.

The memory unit 856 may be any device capable of storing data including magnetic storage, flash storage, etc. The memory unit 256 is used for data and controlling signal buffering and storing for supporting pre-scheduling and the scheduled data transmissions and re-transmissions.

The processing unit 858 may be any device capable of processing data including, for example, a microprocessor configured to carry out specific operations based on input data, or capable of executing instructions included in computer readable code. The data bus 859, the transmitting unit 852, the receiving unit 854, the memory unit 856, and the processing unit 858 are cooperatively configured to perform the functions of the base station 140 described in FIGS. 1-6.

Figure 9:
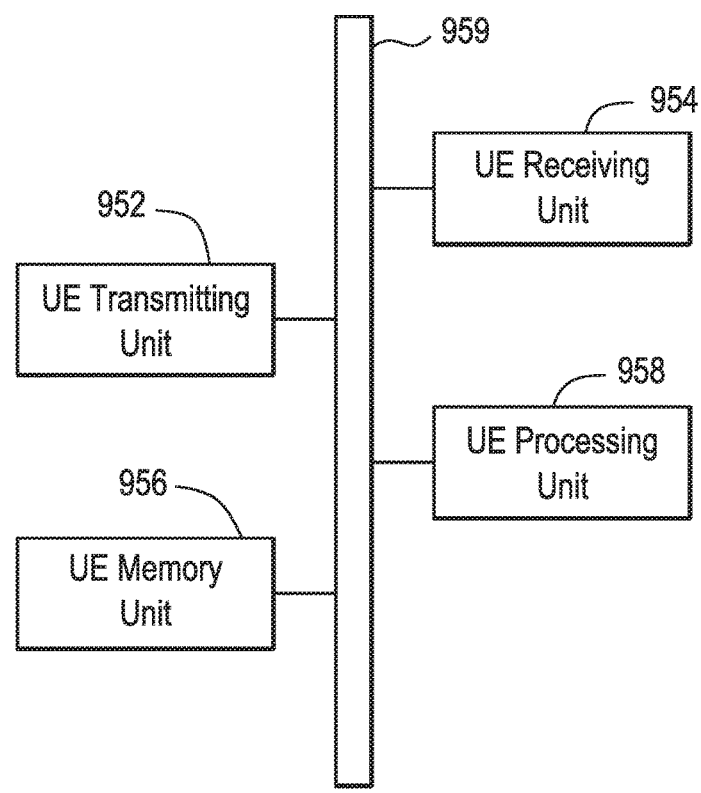

FIG. 9 illustrates the UE 105 according to an example embodiment. It should be also understood that the UE 105 may include features not shown in FIG. 9 and should not be limited to those features that are shown.

Referring to FIG. 9, the UE 105 may include, for example, a data bus 959, a transmitting unit 952, a receiving unit 954, a memory unit 956, and a processing unit 958. While illustrated separately, the transmitting unit 952 and the receiving unit 954 may be a single transceiver.

The transmitting unit 952, receiving unit 954, memory unit 956, and processing unit 958 may send data to and/or receive data from one another using the data bus 859. The transmitting unit 952 is a device that includes hardware and any necessary software for transmitting wireless signals including, for example, data signals, control signals, and signal strength/quality information via one or more wireless connections to other network elements in the wireless communications network 100.

The receiving unit 954 is a device that includes hardware and any necessary software for receiving wireless signals including, for example, data signals, control signals, and signal strength/quality information via one or more wireless connections to other network elements in the network 100.

The memory unit 956 may be any device capable of storing data including magnetic storage, flash storage, etc. The memory unit 256 is used for data and controlling signal buffering and storing for supporting pre-scheduling and the scheduled data transmissions and re-transmissions.

The processing unit 958 may be any device capable of processing data including, for example, a microprocessor configured to carry out specific operations based on input data, or capable of executing instructions included in computer readable code. The data bus 959, the transmitting unit 952, the receiving unit 954, the memory unit 956, and the processing unit 958 are cooperatively configured to perform the functions of the UE 105 described in FIGS. 1-5 and 7.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

The invention claimed is:

1. A method comprising:
    transmitting a plurality of first beacons over a first scanning period, the plurality of first beacons associated with different direct energy beams, the transmitting including,
        transmitting the plurality of first beacons over sub-periods of the first scanning period, respectively;
    transmitting a scanning window signal to a user equipment (UE) on a first frequency band channel, the scanning window signal indicating a duration for the first scanning period for the transmitting the plurality of first beacons of the first scanning period to occur;
    obtaining an indication of a preferred first beacon, the preferred first beacon being received by the UE during the transmitting of the plurality of beacons over the first scanning period, the obtaining including,
        receiving the indication of the preferred first beacon on the first frequency band channel, the first frequency band channel associated with a first frequency band, the direct energy beams associated with a second frequency band, and the first frequency band includes frequencies different than frequencies of the second frequency band; and
    communicating with the UE during a scheduled portion of a first data communication period using the beam associated with the preferred first beacon, a length of the first scanning period and a length of the first data communication period forming a length of a time transmission interval.

2. The method of claim 1, further comprising:
transmitting a subsequent beacon on the beam associated with the preferred first beacon in a subsequent scanning period, the subsequent beacon including scheduling information identifying a physical random access channel (PRACH) uplink slot; and
receiving a PRACH message from the UE in response to the subsequent beacon, the communicating during first data communication period being based on the received PRACH message.

3. The method of claim 1, further comprising:
transmitting the preferred first beacon and scheduling information for the UE during a subsequent scanning period, the subsequent scanning period being subsequent to the first scanning period, the communicating being based on the scheduling information.

4. The method of claim 1, further comprising:
transmitting a plurality of second beacons over a subsequent scanning period, the subsequent scanning period being subsequent to the first data communication period, the second beacons being the same as the first beacons.

5. The method of claim 1, further comprising:
transmitting a plurality of second beacons over a preceding scanning period before the obtaining the indication, the preceding scanning period preceding the first data communication period, the second beacons being the same as the first beacons.

6. The method of claim 1, wherein each of the first beacons includes an identification of the associated beam.

7. The method of claim 1, wherein at least one of the first beacons includes scheduling information identifying a physical random access channel (PRACH) uplink slot.

8. The method of claim 7, wherein obtaining includes,
receiving a PRACH message in response to the UE receiving the scheduling information identifying the PRACH uplink slot, the indication being the received PRACH message.

9. A base station comprising:
a transceiver configured to transmit a plurality of first beacons over a first scanning period, the plurality of first beacons associated with different direct energy beams, the transceiver further configured to,
transmit the plurality of first beacons over sub-periods of the first scanning period, respectively, and
transmit a scanning window signal to a user equipment (UE) on a first frequency band channel, the scanning window signal indicating a duration for the first scanning period for the transmitting the plurality of first beacons of the first scanning period to occur; and
a processor configured to,
obtain an indication of a preferred first beacon on the first frequency band channel, the first frequency band channel associated with a first frequency band, the direct energy beams associated with a second frequency band, and the first frequency band includes frequencies different than frequencies of the second frequency band, the preferred first beacon being received by the UE during the transmitting of the plurality of beacons over the first scanning period, and
communicate with the UE during a scheduled portion of a first data communication period using the beam associated with the preferred first beacon, a length of the first scanning period and a length of the first data communication period forming a length of a time transmission interval.

10. The base station of claim 9, wherein the transceiver is configured to,
transmit a subsequent beacon on the beam associated with the preferred first beacon in a subsequent scanning period, the subsequent beacon including scheduling information identifying a physical random access channel (PRACH) uplink slot; and
receive a PRACH message from the UE in response to the subsequent beacon, the communicating during first data communication period being based on the received PRACH message.

11. The base station of claim 9, wherein the transceiver is configured to,
transmit the preferred first beacon and scheduling information for the UE during a subsequent scanning period, the subsequent scanning period being subsequent to the first scanning period, the communicating being based on the scheduling information.

12. The base station of claim 9, wherein the transceiver is configured to,
transmit a plurality of second beacons over a subsequent scanning period, the subsequent scanning period being subsequent to the first data communication period, the second beacons being the same as the first beacons.

13. The base station of claim 9, wherein the transceiver is configured to,
transmit a plurality of second beacons over a preceding scanning period before the obtaining the indication, the preceding scanning period preceding the first data communication period, the second beacons being the same as the first beacons.

14. The base station of claim 9, wherein each of the first beacons includes an identification of the associated beam.

15. The base station of claim 9, wherein at least one of the first beacons includes scheduling information identifying a physical random access channel (PRACH) uplink slot.

16. The base station of claim 15, wherein the processor is configured to,
obtain a PRACH message in response to the UE receiving the scheduling information identifying the PRACH uplink slot, the indication being the obtained PRACH message.

* * * * *